United States Patent
Liu et al.

(10) Patent No.: US 9,336,179 B2
(45) Date of Patent: May 10, 2016

(54) COMPUTER SUBSYSTEM AND COMPUTER SYSTEM WITH COMPOSITE NODES IN AN INTERCONNECTION STRUCTURE

(71) Applicant: Huawei Technologies Co., Ltd., Shenzhen, Guangdong (CN)

(72) Inventors: Jiangen Liu, Hangzhou (CN); Chenghong He, Shenzhen (CN); Haibin Wang, Hangzhou (CN); Xinyu Hou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 240 days.

(21) Appl. No.: 13/670,718

(22) Filed: Nov. 7, 2012

(65) Prior Publication Data

US 2013/0067197 A1    Mar. 14, 2013

Related U.S. Application Data

(63) Continuation of application No. PCT/CN2011/076279, filed on Jun. 24, 2011.

(51) Int. Cl.
   *G06F 9/30* (2006.01)
   *G06F 15/173* (2006.01)
   *G06F 15/167* (2006.01)

(52) U.S. Cl.
   CPC ........ *G06F 15/17337* (2013.01); *G06F 15/167* (2013.01)

(58) Field of Classification Search
   None
   See application file for complete search history.

(56) References Cited

U.S. PATENT DOCUMENTS 5,367,636 A    11/1994   Colley et al.
6,230,252 B1 *   5/2001   Passint et al. .................. 712/12
(Continued)

FOREIGN PATENT DOCUMENTS

CN    1537376 A    10/2004
CN    1554055 A    12/2004
(Continued)

OTHER PUBLICATIONS

International search report for International application No. PCT/CN2011/076279, dated Mar. 29, 2012, total 11 pages.
(Continued)

*Primary Examiner* — William B Partridge
(74) *Attorney, Agent, or Firm* — Huawei Technologies Co., Ltd.

(57) ABSTRACT

The present invention provides a computer subsystem and a computer system. The computer subsystem includes L composite nodes, each composite node includes M basic nodes, each basic node includes N central processing units CPUs and one node controller NC, where any two CPUs in each basic node are interconnected, each CPU in each basic node is connected to the NC in the basic node, the NC in each basic node has a routing function, any two NCs in the M basic nodes are interconnected, and a connection between the L composite nodes formed through a connection between NCs enable communication between any two NCs to require at most three hops. The computer subsystem and the computer system according to embodiments of the present invention can reduce the kinds and the number of interconnection chips, and simplify an interconnection structure of a system, thereby improving reliability of the system.

9 Claims, 6 Drawing Sheets

(56) References Cited

U.S. PATENT DOCUMENTS

| | | | |
|---|---|---|---|
| 2001/0035278 | A1 | 11/2001 | Weyer |
| 2003/0018927 | A1 | 1/2003 | Gadir et al. |
| 2003/0039262 | A1 | 2/2003 | Wong |
| 2005/0021699 | A1* | 1/2005 | Kota et al. ............ 709/221 |
| 2005/0080894 | A1* | 4/2005 | Apostolopoulos et al. ... 709/224 |
| 2006/0075145 | A1 | 4/2006 | Mueller |
| 2006/0106931 | A1* | 5/2006 | Richoux ............ 709/226 |
| 2006/0174048 | A1 | 8/2006 | Ohara et al. |
| 2006/0224685 | A1 | 10/2006 | Begun et al. |
| 2007/0106833 | A1 | 5/2007 | Rankin et al. |
| 2008/0222303 | A1* | 9/2008 | Archer et al. ............ 709/238 |
| 2010/0002707 | A1 | 1/2010 | Chang |
| 2011/0010468 | A1 | 1/2011 | Hu |
| 2011/0055452 | A1 | 3/2011 | Suzuki et al. |

FOREIGN PATENT DOCUMENTS

| | | | |
|---|---|---|---|
| CN | 1710529 | A | 12/2005 |
| CN | 1811744 | A | 8/2006 |
| CN | 1841330 | A | 10/2006 |
| CN | 101027658 | A | 8/2007 |
| CN | 101076790 | A | 11/2007 |
| CN | 101216815 | A | 7/2008 |
| CN | 101330426 | A | 12/2008 |
| CN | 101635679 | A | 1/2010 |
| EP | 1125657 | A2 | 2/2001 |

OTHER PUBLICATIONS

Chinese office action for Chinese application No. 201180000848.9, dated May 3, 2012,and an English translation thereof,total 11 pages.

Second office action issued in corresponding Chinese application No. 201180000848.9, dated Aug. 30, 2012, and an English translation thereof, total 13 pages.

Third office action issued in corresponding Chinese application No. 201180000848.9, dated Nov. 27, 2012, and an English translation thereof, total 9 pages.

Search report issued in corresponding European patent application No. 11857888.9, dated Apr. 24, 2013, total 7 pages.

Kota R et al., "Horus: Large-scale symmetric multiprocessing for opteron systems," Mar. 1, 2005, total 11 pages.

Intel, "An introduction to the Intel quickpath interconnect," Jan. 1, 2009, total 22 pages.

Arndt Bode, "Parallelrechner: architekturen—systeme—werkzeuge" in :"Parallelrechner: architekturen—systeme—werkzeuge," Jan. 1, 1995, total 10 pages.

Front page of corresponding granted Chinese U.S. Pat. No. 102232218 (Application No. 201180000848.9) citing prior art at Item (56), issued Apr. 24, 2013, 1 page only.

International Search Report and Written Opinion issued in corresponding PCT application No. PCT/CN2011/076279, dated Mar. 29, 2012, total 14 pages.

* cited by examiner (A)

(B)

Composite node: "CN" for short

COMPUTER SUBSYSTEM AND COMPUTER SYSTEM WITH COMPOSITE NODES IN AN INTERCONNECTION STRUCTURE

CROSS-REFERENCE TO RELATED APPLICATIONS

This application is a continuation of International Application No. PCT/CN2011/076279, filed on Jun. 24, 2011, which is hereby incorporated by reference in their entireties.

FIELD OF THE INVENTION

The present invention relates to the computer field, and in particular, to a computer subsystem and a computer system in the computer field.

BACKGROUND OF THE INVENTION

From the perspective of system architecture, current business servers may be generally categorized into three types, namely, the symmetric multi-processor (Symmetric Multi-Processor, "SMP" for short) structure, the non-uniform memory access (Non-Uniform Memory Access, "NUMA" for short) structure, and the massive parallel processing (Massive Parallel Processing, "MPP" for short) structure.

A so-called server with the symmetric multi-processor structure refers to a server, in which multiple central processing units (Central Processing Unit, "CPU" for short) work symmetrically and do not have a primary-secondary or master-slave relationship, each CPU shares the same physical memory, and the time needed by each CPU to access any address in the memory is the same. However, a server of this type has very limited performance in scalability. A server with the NUMA structure is basically characterized by having multiple CPU modules, each CPU module is formed of multiple (for example, four) CPUs and has an independent local memory and I/O (Input/Output) slots; nodes may be interconnected and exchange information through an interconnection module; therefore, the speed of a CPU accessing a local memory is much higher than that of accessing a remote memory (a memory of another node in the system); furthermore, for a server of this type, when the number of CPU increases, the performance of the server cannot be improved linearly. In a server with the MPP structure, multiple servers with the SMP structure are connected by a certain node interconnection network, each node of a server with the SMP structure may run an operating system and database thereof, but a CPU in each node cannot access the memory of another node, and information exchange between nodes is implemented through an interconnection network between the nodes.

At present, a business server usually adopts a multi-node interconnection structure. In the multi-node interconnection structure, each node is a data processing module, the data processing module includes multiple (for example, two) CPUs that are interconnected and a node controller (Node Controller, "NC" for short). The nodes or data processing modules are connected through an interconnection module, and the interconnection module is usually formed of multiple interconnection chips, such as crossbar switches (Crossbar Switch, "Xbar" for short). Therefore, for the server formed by connecting nodes or data processing modules through an interconnection module, not only many kinds and a large quantity of interconnection chips are required, and the connection is complicated, but also the reliability of the system is poor, and the delay of the inter-node accessing is long, thereby affecting the running efficiency of the system.

SUMMARY OF THE INVENTION

Embodiments of the present invention provide a computer subsystem and a computer system which are capable of reducing the kinds and the number of interconnection chips, and at the same time simplifying an interconnection structure of a system, improving reliability of the system, and shortening delay of inter-node accessing, thereby improving running efficiency of the system.

In one aspect, an embodiment of the present invention provides a computer subsystem. The computer subsystem includes L composite nodes, each composite node includes M basic nodes, each basic node includes N central processing units CPUs and one node controller NC, where any two CPUs in each basic node are interconnected, each CPU in each basic node is connected to the NC in the basic node, the NC in each basic node has a routing function, any two NCs in the M basic nodes are interconnected, and a connection between the L composite nodes formed through a connection between NCs of different composite nodes enables communication between any two NCs to require three hops at most, where L is a natural number and L is greater than or equal to 4, M is a natural number and M is greater than or equal to 1, and N is a natural number and N is greater than or equal to 2.

In another aspect, an embodiment of the present invention provides a computer system. The computer system includes two identical computer subsystems according to the embodiment of the present invention, where a first computer subsystem or a second computer subsystem includes L composite nodes, each composite node includes M basic nodes, each basic node includes N central processing units CPUs and one node controller NC, any two CPUs in each basic node are interconnected, each CPU in each basic node is connected to the NC in the basic node, the NC in each basic node has a routing function, any two NCs in the M basic nodes are interconnected, and a connection between the L composite nodes formed through a connection between NCs of different composite nodes enables communication between any two NCs to require three hops at most, where L is a natural number and L is greater than or equal to 4, M is a natural number and M is greater than or equal to 1, and N is a natural number and N is greater than or equal to 2. At least one NC in each composite node of the first computer subsystem and an NC of a corresponding basic node in a corresponding composite node of the second computer subsystem are interconnected.

Based on the foregoing technical solutions, in the computer subsystem and the computer system according to embodiments of the present invention, by directly connecting an NC having a routing function to a CPU, Xbar interconnection chips are avoided, thereby reducing the kinds and the number of interconnection chips, and at the same time simplifying an interconnection structure of a system, and improving the reliability of the system. Furthermore, through the connections between NCs, communication between any two NCs needs three hops at most, thereby shortening the delay of inter-node accessing and improving the running efficiency of the system.

BRIEF DESCRIPTION OF THE DRAWINGS

To illustrate the technical solutions according to the embodiments of the present invention more clearly, the accompanying drawings for describing the embodiments of the present invention are introduced briefly in the following. Apparently, the accompanying drawings in the following description are some embodiments of the present invention, and persons skilled in the art may derive other drawings from the accompanying drawings without creative efforts.

DETAILED DESCRIPTION OF THE EMBODIMENTS

The technical solutions according to the embodiments of the present invention are clearly and completely described in the following with reference to the accompanying drawings. Apparently, the embodiments in the following description are a part rather than all of the embodiments of the present invention. All other embodiments obtained by persons skilled in the art based on the embodiments of the present invention without creative efforts shall fall within the protection scope of the present invention.

Figure 1:
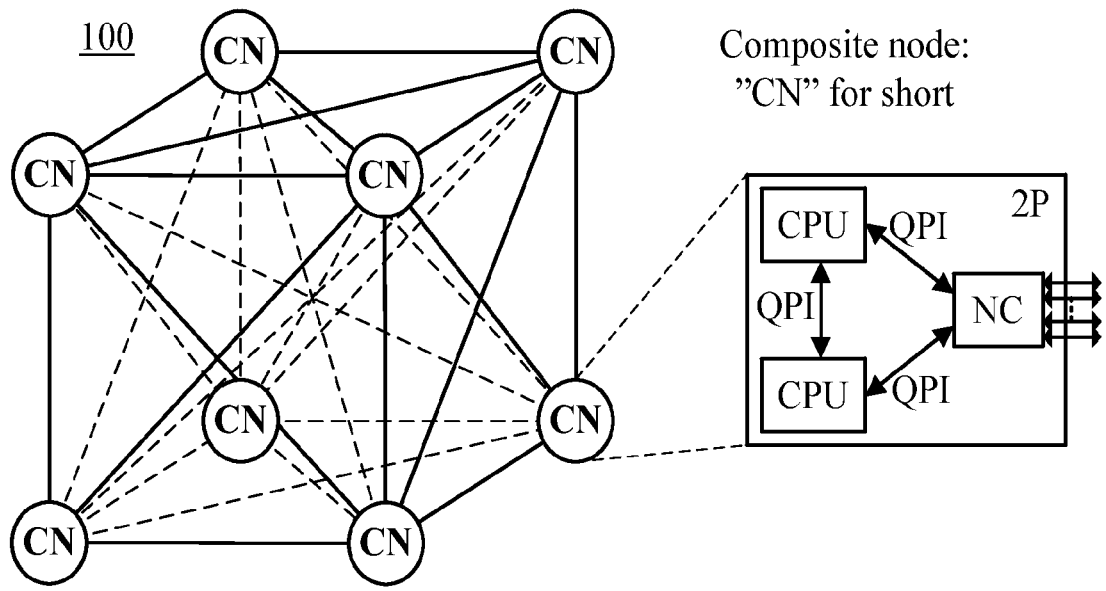
FIG. 1 is a schematic structural block diagram of a computer subsystem according to an embodiment of the present invention.

FIG. 1 is a schematic structural block diagram of a computer subsystem according to an embodiment of the present invention. The computer subsystem according to the embodiment of the present invention includes L composite nodes, each composite node includes M basic nodes, each basic node includes N CPUs and one NC, any two CPUs in each basic node are interconnected, each CPU in each basic node is connected to an NC in the basic node, an NC in each basic node has a routing function, any two NCs in the M basic nodes are interconnected; and a connection between the L composite nodes formed through a connection between NCs of different composite nodes enables communication between any two NCs to require three hops at most, where L is a natural number and L is greater than or equal to 4, M is a natural number and M is greater than or equal to 1, and N is a natural number and N is greater than or equal to 2.

Specifically, for example, as shown in FIG. 1, a computer subsystem 100 includes eight composite nodes, each composite node includes one basic node, and the basic node includes two CPUs and one NC. In the basic node, the two CPUs are interconnected and both connected to the NC, and the NC has a routing function, that is, each interconnection interface in the NC supports full routing and switching and is capable of routing information from an NC of an adjacent basic node to an NC of another adjacent node. The eight composite nodes are connected through connections between different composite nodes and any two NCs are interconnected directly; in this manner, communication between any two NCs needs only one hop. That is, in the embodiment shown in FIG. 1, L is 8, M is 1, and N is 2, and the connections between composite nodes enable the communication between any two NCs to needs only one hop.

It should be understood that the embodiment of the present invention is merely described by taking an example of the computer subsystem 100 shown in FIG. 1, but the computer subsystem 100 is not intended to impose any limitation on the present invention.

In the computer subsystem according to the embodiment of the present invention, by directly connecting an NC having a routing function to a CPU, Xbar interconnection chips can be avoided, so that the kinds and the number of interconnection chips are reduced, and at the same time the interconnection structure of the system is simplified to avoid a higher failure rate caused by complicated connections, thereby improving the reliability of the system. Furthermore, through the connections between the NCs, the communication between any two NCs needs three hops at most, thereby shortening the delay of inter-node accessing and improving the running efficiency of the system.

In an embodiment of the present invention, each basic node may include N CPUs and an NC, where N is a natural number and N is greater than or equal to 2. For example, as shown by (A) in FIG. 2, a basic node 3P includes three CPUs and an NC, any two CPUs in the basic node 3P are interconnected, each CPU is connected to the NC in the basic node, and the NC in the basic node 3P has a routing function. For example, as shown by (B) in FIG. 2, a basic node 4P includes four CPUs and an NC, and any two CPUs in the basic node 4P are interconnected, that is, any two CPUs are connected directly, all of the four CPUs are connected to the NC in the basic node, and the NC in the basic node 4P has a routing function.

It should be understood that that each basic node has a routing function refers to that an NC in each basic node is capable of routing information from an NC of a first basic node connected to the basic node to an NC of a second basic node connected to the basic node. Because the NC has the routing function, in the computer subsystem, not only the kinds and the number of interconnection chips can be reduced, but also the delay of inter-node accessing can be shortened at the same time and the running efficiency of the system is improved.

Alternatively, as shown in FIG. 1, each basic node includes two CPUs and one NC. Furthermore, following descriptions are made by taking an example of a basic node 2P including two CPUs and one NC, but the present invention is not limited to this.

It should be understood that the connection between a CPU and a CPU, the connection between a CPU and an NC, and the connection between an NC and an NC in different composite nodes may all adopt an interconnection technology in the related art. For example, the connection between a CPU and a CPU and the connection between a CPU and an NC adopt the quick path interconnect (Quick Path Interconnect, "QPI" for short) technology, and the connection between an NC and an NC in different composite nodes may also adopt the QPI technology.

It should also be understood that, in the embodiment of the present invention, descriptions are made by taking an example of a basic node including one NC; but the embodiment of present invention is not limited to this, each basic node of a computer subsystem according to the embodiment of the present invention may include multiple NCs, for example, each basic node includes at least two CPUs and at least one NC.

In an embodiment of the present invention, each composite node may include M basic nodes, where M is a natural number and M is greater than or equal to 1, and any two NCs in the M basic nodes are interconnected. For example, as shown by (A) and (B) in FIG. 2, each composite node includes only one basic node, that is, M is 1. For example, M may also be 2, 3, or 4, as shown in FIG. 3.

Figure 3:
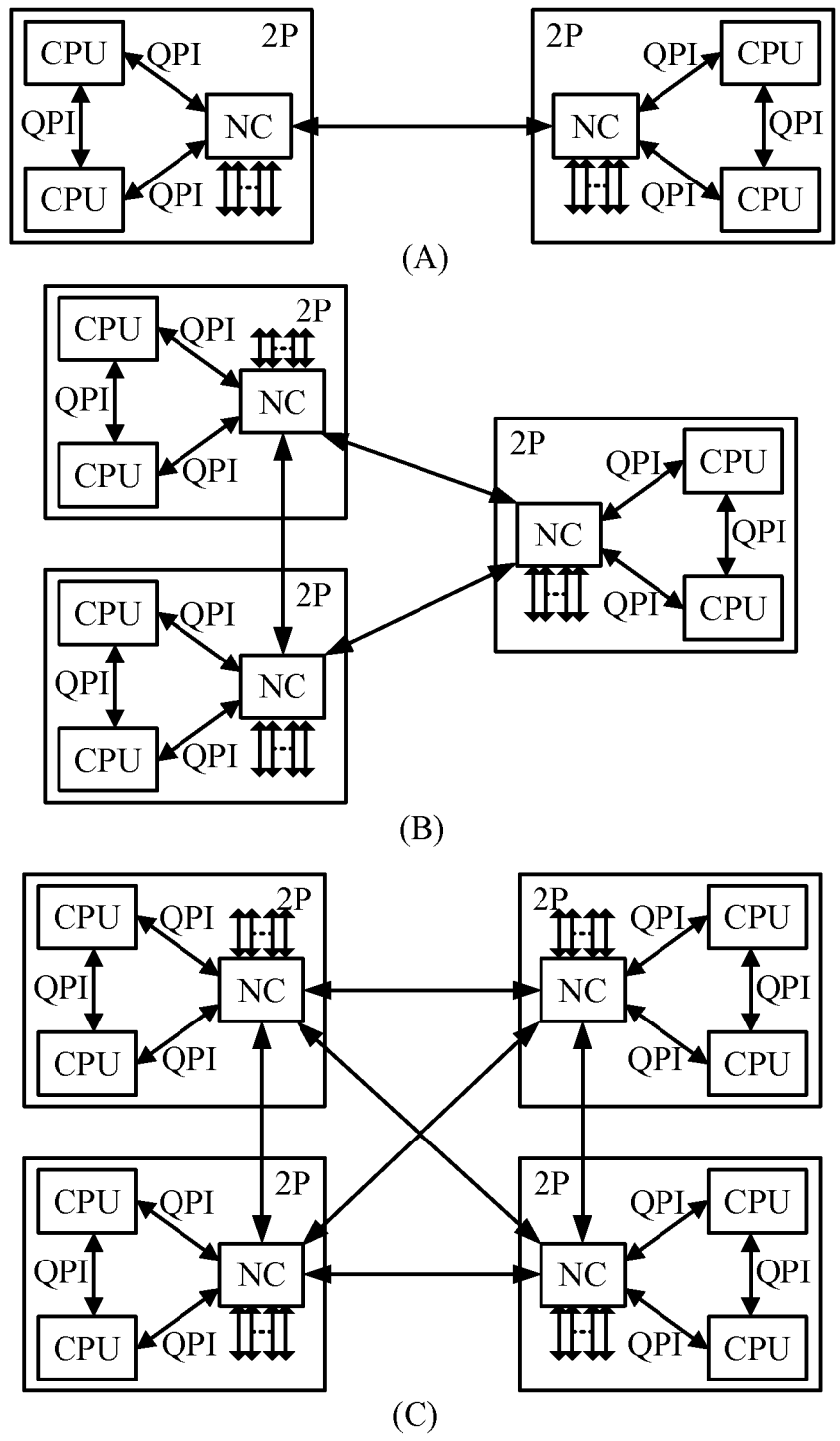
FIG. 3 is a schematic block diagram of composite nodes in a computer subsystem according to an embodiment of the present invention.

FIG. 3 is a schematic block diagram of composite nodes in computer subsystems according to an embodiment of the present invention. In (A) of FIG. 3, each composite node includes two identical basic nodes 2P; in each basic node 2P, any two CPUs are interconnected, and each CPU is connected to an NC in the basic node; in the composite node, two basic nodes 2P are interconnected through the respective NC of the two basic nodes 2P to form the composite node. In (B) of FIG. 3, each composite node includes three identical basic nodes 2P, and any two NCs in the three basic nodes 2P are interconnected, so as to form the composite node. Similarly, in (C) of FIG. 4, each composite node includes four identical basic nodes 2P and an NC in each basic node 2P is connected to NCs in the other three basic nodes 2P. In this manner, any two NCs in the four basic nodes 2P are interconnected, so as to form the composite node.

It should be understood that because any two NCs in M basic nodes are interconnected, and any two NCs are capable of directly communicating with each other in each composite node, that is, the communication between any two NCs needs only one hop. Therefore, the delay of accessing between composite nodes can be further shortened and the running efficiency of the system is improved.

Figure 2:
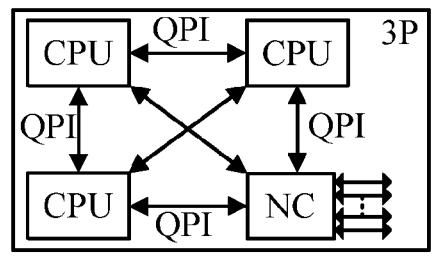
FIG. 2 is a schematic block diagram of basic nodes in a computer subsystem according to an embodiment of the present invention.
Figure 2:
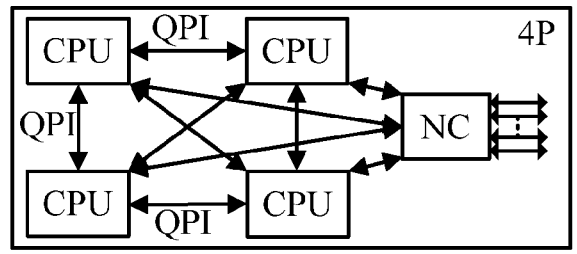
Figure 4:
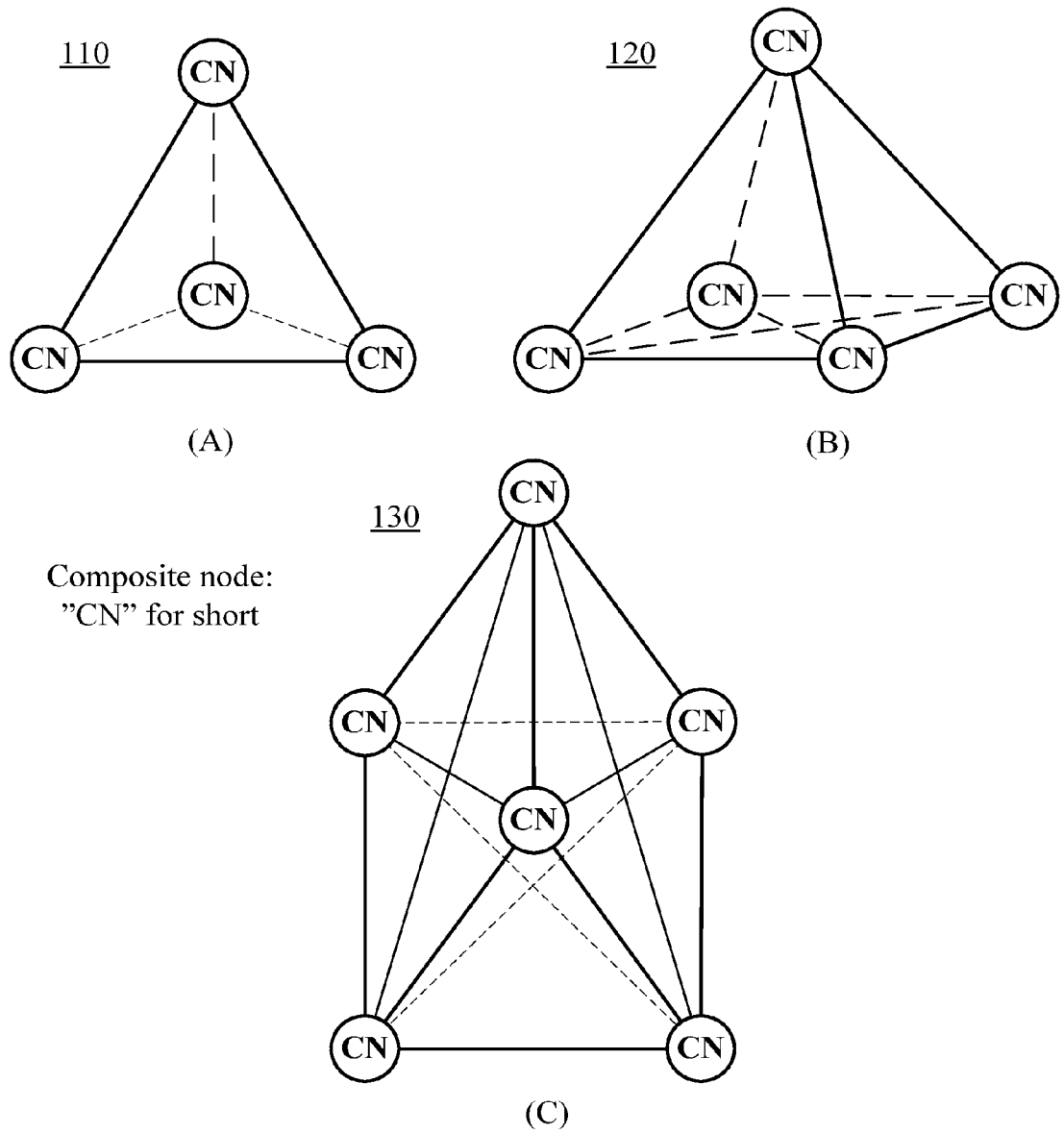
FIG. 4 is a schematic structural block diagram of computer subsystems with different numbers of composite nodes according to an embodiment of the present invention.

In an embodiment of the present invention, a computer subsystem may include L composite nodes, where L is a nature number and L is greater than or equal to 4; the L composite nodes are connected through connections between NCs of different composite nodes, and communication between any two NCs needs three hops at most. FIG. 4 is a schematic structural block diagram of computer subsystems with different numbers of composite nodes according to an embodiment of the present invention. As shown by (A) in FIG. 4, a computer subsystem 110 includes four composite nodes, each composite node, as shown in FIG. 3, may include M basic nodes, each basic node, as shown in FIG. 2, may include N CPUs and an NC, the four composite nodes are connected through connections between NCs of different composite nodes, and communication between any two NCs needs three hops at most. Similarly, as shown by (B) and (C) in FIG. 4, a computer subsystem 120 includes five composite nodes, and a computer subsystem 130 includes six composite nodes. Alternatively, a computer subsystem according to an embodiment of the present invention includes an even number of composite nodes, that is, L is an even number and L is greater than or equal to 4. Preferably, as shown in FIG. 1, a computer subsystem includes eight composite nodes. Following descriptions are made by taking an example of a computer subsystem including eight composite nodes, but the present invention is not limited to this.

It should be understood that in embodiments of the present invention, computer subsystems each including L composite nodes are always presented in a three-dimensional architecture to better display a connection relationship between composite nodes. In actual applications, the computer subsystem may be arranged in a plane or arranged according to a three-dimensional structure, which is not limited in the present invention.

In the embodiment of the present invention, the connection between different composite nodes enables the communication between any two NCs to require three hops at most. For a case in which each composite node includes only one basic node, optionally, any two NCs in the L composite nodes are interconnected. As shown in FIG. 1, the computer subsystem 100 includes eight composite nodes, each composite node includes only one basic node, and an NC of each composite node is connected to NCs of the other seven composite nodes, so that the communication between any two NCs needs only one hop. In this case, each composite node among the eight composite nodes is in an absolutely same position.

Figure 5:
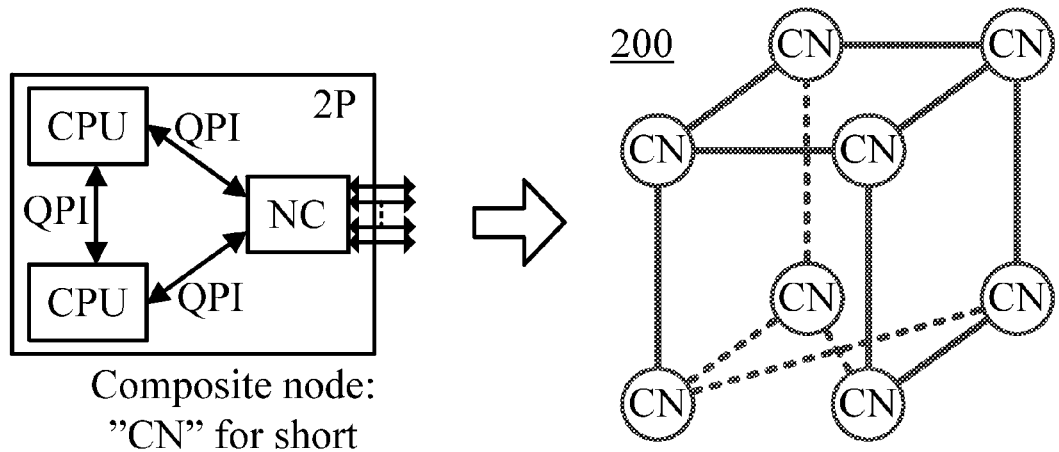
FIG. 5 is a schematic structural block diagram of a computer subsystem according to another embodiment of the present invention.

Optionally, as shown in FIG. 5, when each composite node includes one basic node, for the computer subsystem including eight composite nodes, each NC in the eight composite nodes and other three NCs in the eight composite nodes are interconnected, and communication between any two NCs in the L composite nodes needs two hops at most, and therefore a computer subsystem including 16 CPUs is formed. For example, communication between any two composite nodes on a top face needs one hop, but communication between two composite nodes at two ends of a body diagonal needs two hops.

Figure 6:
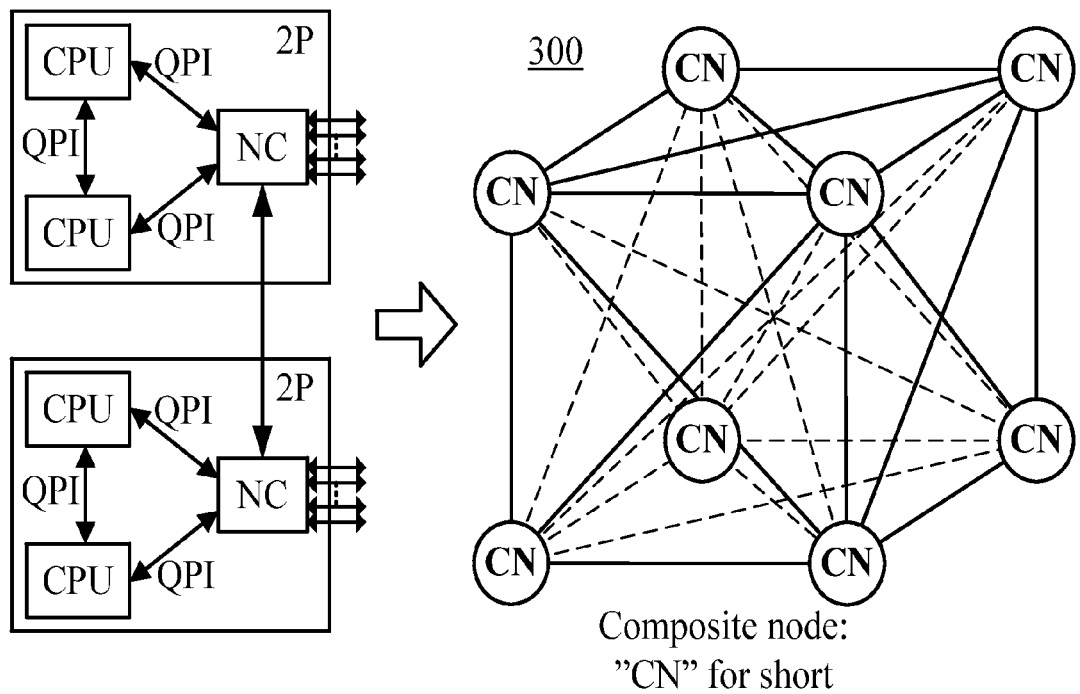
FIG. 6 is a schematic structural block diagram of a computer subsystem according to still another embodiment of the present invention.

When each composite includes at least two basic nodes, optionally, NCs of corresponding basic nodes in any two composite nodes are interconnected. For example, as shown in FIG. 6, a computer subsystem 300 includes eight composite nodes, each composite node includes two basic nodes which are called a first basic node and a second basic node, and each basic node includes two CPUs and one NC. In any composite node, an NC of a first basic node is only connected to NCs of first basic nodes in other composite nodes, and an NC of a second basic node is only connected to NCs of corresponding second basic nodes, so that a computer subsystem including 32 CPUs is formed.

Figure 7:
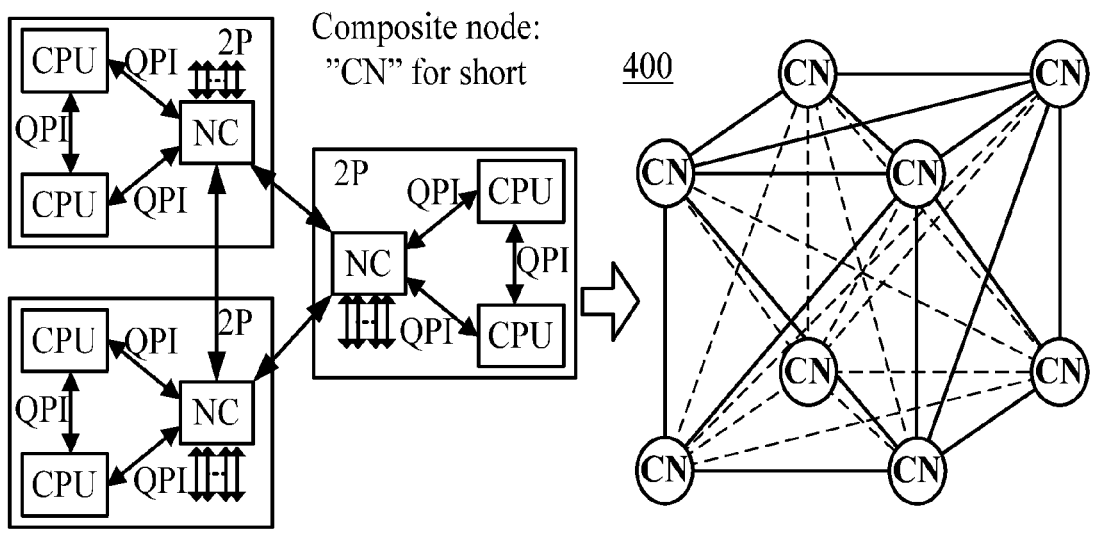
FIG. 7 is a schematic structural block diagram of a computer subsystem according to still another embodiment of the present invention.

Similarly, FIG. 7 shows a computer subsystem 400, in which each composite node includes three basic nodes. In the computer subsystem 400, the three basic nodes included in each composite node may be called a first basic node, a second basic node, and a third basic node respectively. NCs of corresponding basic nodes in any two composite nodes are interconnected. The word corresponding means that for any two specific composite nodes, an NC of a first basic node of one composite node is only connected to an NC of a first basic node of the other composite node, an NC of a second basic node of one composite node is only connected to an NC of a second basic node of the other composite node, and an NC of a third basic node of one composite node is only connected to an NC of a third basic node of the other composite node. In this manner, a computer subsystem including 48 CPUs is formed.

For the computer subsystem 400 shown in FIG. 7, it may be understood that the computer subsystem 400 may be considered to include eight composite nodes, the eight composite nodes form a cubic structure, each composite node is corresponding to a vertex of the cube, each vertex is in the absolutely same position, and each composite node includes three basic nodes. In another aspect, for the computer subsystem 400, it may also be understood that first basic nodes, second basic nodes, and third basic nodes in each composite node form a cubic structure separately, a vertex of each cube is corresponding to a basic node, and corresponding vertexes of the three cubes are interconnected, that is, it may be also considered that the computer subsystem 400 includes three computer subsystems 100 shown in FIG. 1 and the corresponding vertexes of the three computer subsystems 100 are interconnected.

Therefore, in the computer subsystem according to the embodiment of the present invention, by directly connecting an NC having a routing function to a CPU, Xbar interconnection chips can be avoided, so that the kinds and the number of interconnection chips can be reduced, and at the same time the interconnection structure of the system can be simplified to avoid a higher failure rate caused by complicated connections, thereby improving the reliability of the system. Furthermore, through the connections between the NCs, the communication between any two NCs needs three hops at most, thereby shortening the delay of inter-node accessing and improving the running efficiency of the system.

In another aspect, an embodiment of the present invention further provides a computer system. The computer system is described below with reference to FIG. 8 to FIG. 10.

Figure 8:
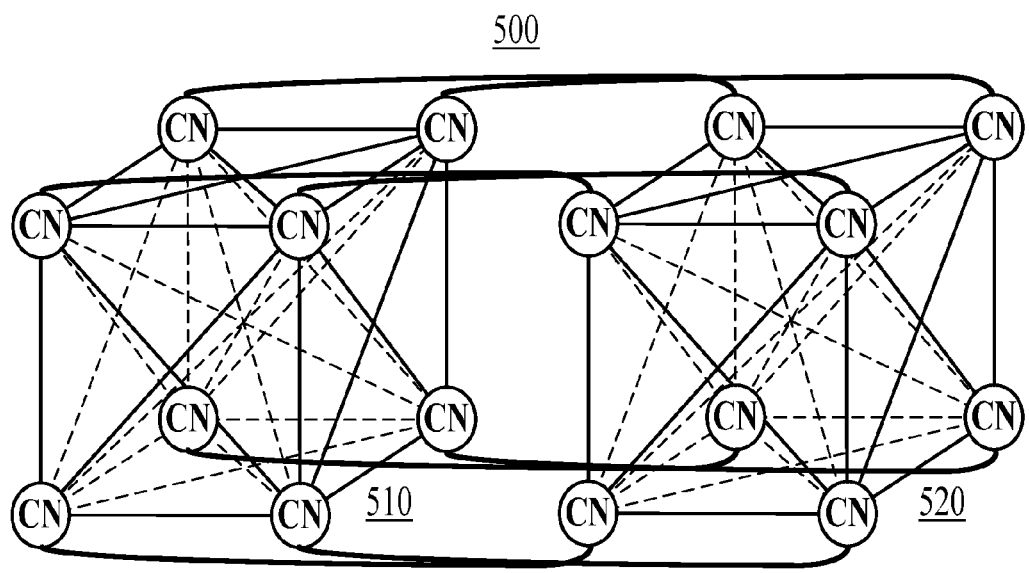
FIG. 8 is a schematic structural block diagram of a computer system according to an embodiment of the present invention.

FIG. 8 is a schematic structural block diagram of a computer system according to an embodiment of the present invention. The computer system according to an embodiment of the present invention includes two identical computer subsystems according to the embodiment of the present invention, where a first computer subsystem or a second computer subsystem includes L composite nodes, each composite node includes M basic nodes, each basic node includes N central processing units CPUs and one node controller NC, any two CPUs in each basic node are interconnected, each CPU in each basic node is connected to an NC in the basic node, an NC in each basic node has a routing function, any two NCs in the M basic nodes are interconnected, and a connection between the L composite nodes formed through a connection between NCs of different composite nodes enables communication between any two NCs to require three hops at most, where L is a natural number and L is greater than or equal to 4, M is a natural number and M is greater than or equal to 1, and N is a natural number and N is greater than or equal to 2. At least one NC in each composite node of the first computer subsystem and an NC of a corresponding basic node in a corresponding composite node of the second computer subsystem are interconnected.

Specifically, for example, as shown in FIG. 8, a computer system 500 includes two identical computer subsystems 510 and 520 according to the embodiment of the present invention, where at least one NC in each composite node of the first computer subsystem 510 and an NC of a corresponding basic node in a corresponding composite node of the second computer subsystem 520 are interconnected. For example, each composite node of 510 or 520 includes two basic nodes called a first basic node and a second basic node, an NC of a first basic node of a first composite node in 510 is connected to an NC of a first basic node of a first composite node in 520, an NC of a first basic node of a second composite node in 510 is connected to an NC of a first basic node of a second composite node in 520, and an NC of a second basic node of a second composite node in 510 is connected to an NC of a second basic node of a second composite node in 520.

In the embodiment of the present invention, each basic node of a computer subsystem may include two CPUs and one NC. Optionally, a computer subsystem may include eight composite nodes. Optionally, an NC in each basic node of a computer subsystem is capable of routing information from an NC of a first basic node connected to the basic node to an NC of a second basic node connected to the basic node. Optionally, when each composite node includes one basic node, any two NCs in the L composite nodes of the computer subsystem are interconnected. Optionally, when each composite node includes one basic node, each NC in the L composite nodes of the computer subsystem and other three NCs in the L composite nodes are interconnected, which enables communication between any two NCs in the L composite nodes to needs two hops at most. Optionally, when M is greater than or equal to 2, NCs of corresponding basic nodes in any two composite nodes of a computer subsystem are interconnected.

It should be understood that the embodiment of the present invention is described by taking an example of a computer subsystem including eight composite nodes, in which each basic node includes two CPUs and one NC, but the present invention is not limited to this.

For example, when the computer system shown in FIG. 8 includes a computer subsystem shown in FIG. 5, a computer system including 32 CPUs may be formed of computer subsystems each including 16 CPUs in a convenient and efficient way; when the computer system shown in FIG. 8 includes a computer subsystem shown in FIG. 6, a computer system including 64 CPUs may be formed of computer subsystems each including 32 CPUs in a convenient and efficient way; when the computer system shown in FIG. 8 includes a computer subsystem shown in FIG. 7, a computer system including 96 CPUs may be formed of computer subsystems each including 48 CPUs in a convenient and efficient way.

Therefore, in the computer system according to the embodiment of the present invention, through the interconnection of NCs of corresponding basic nodes in corresponding composite nodes of two identical computer subsystems, not only the kinds and the number of interconnection chips can be reduced, and the interconnection structure of the system can be simplified to avoid a higher failure rate caused by complicated connections, thereby enhancing the reliability of the system and improving the running efficiency of the system. Furthermore, the number of CPUs of an interconnected system may be increased in an efficient way, the interconnection of CPUs is simplified, and the delay of inter-node accessing is shortened.

Optionally, each NC of each composite node of the first computer subsystem and an NC of a corresponding basic node in a composite node of the second computer subsystem are interconnected.

Figure 9:
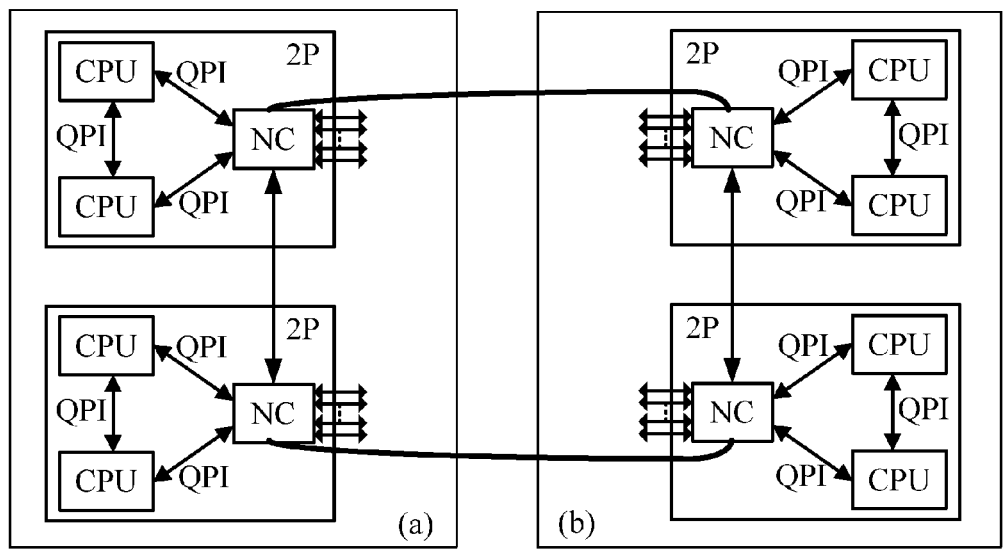
FIG. 9 is a schematic connection block diagram of corresponding composite nodes of two computer subsystems in a computer system according to an embodiment of the present invention.

For example, as shown in FIG. 9, each composite node includes two basic nodes. (a) in FIG. 9 is, for example, a schematic diagram of a composite node in the first computer subsystem, and (b) in FIG. 9 is, for example, a schematic diagram of a corresponding composite node in the second computer subsystem, which are, for example, both first composite nodes. In FIG. 9, an NC of a first basic node in the first composite node of the first computer subsystem is connected to an NC of a first basic node in the first composite node of the second computer subsystem, and an NC of a second basic node in first composite node of the first computer subsystem is connected to an NC of a second basic node in the first composite node of the second computer subsystem.

It should be understood that the computer system corresponding to FIG. 9 may be considered to have a computer subsystem with the architecture shown in FIG. 1, where a composite node of the computer subsystem includes four basic nodes, and the connections between NCs of the basic nodes are shown in FIG. 9.

Figure 10:
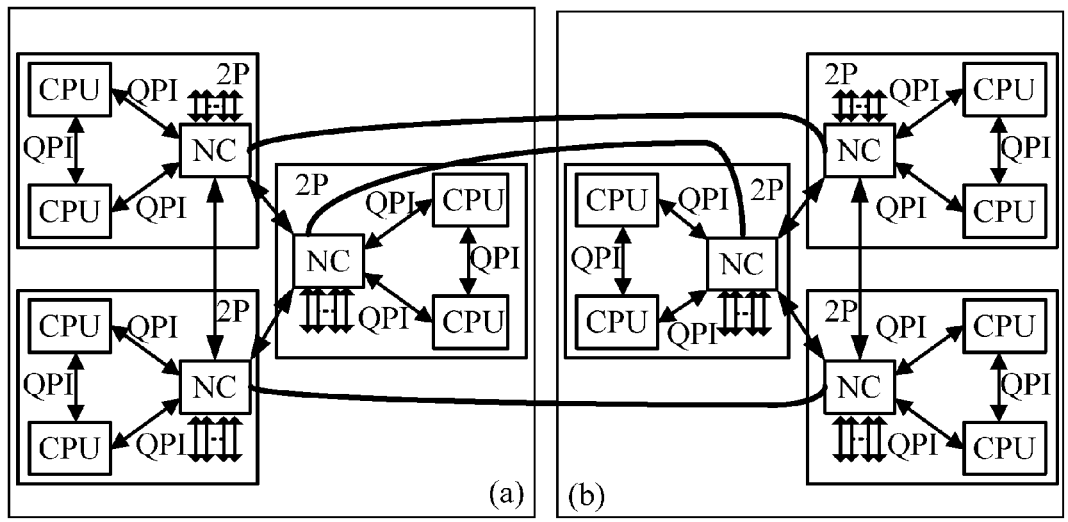
FIG. 10 is a schematic connection block diagram of corresponding composite nodes of two computer subsystems in a computer system according to another embodiment of the present invention.

Similarly, FIG. 10 is a schematic connection block diagram of corresponding composite nodes of two computer subsystems in a computer system according to an embodiment of the present invention. As shown in FIG. 10, each composite node includes three basic nodes, where (a) in FIG. 10 is, for example, a schematic diagram of a composite node in a first computer subsystem, (b) in FIG. 10 is, for example, a schematic diagram of a corresponding composite node in a second computer subsystem, which are, for example, both first composite nodes. Each NC in each composite node of the first computer subsystem and an NC of a corresponding basic node in a corresponding composite node of the second computer subsystem are interconnected.

Therefore, in the computer system according to the embodiment of the present invention, through the interconnection of NCs of corresponding basic nodes in corresponding composite nodes of two identical computer subsystems, the number of CPUs of an interconnected system may be increased in an efficient way, the interconnection of CPUs is simplified, the reliability of the system can be improved, and the delay of inter-node accessing is shortened, thereby improving the running efficiency of the system.

It should be understood that the embodiment of the present invention is illustrated with an example where two identical computer subsystems form a computer system, but three or more identical computer subsystems may also form a computer system, where, optionally, each NC in each composite node of each computer subsystem and an NC of a corresponding basic node in a corresponding composite node of each of other computer subsystems are interconnected.

It should be understood that although the present invention has been described above in detail with reference to the accompanying drawings and exemplary embodiments, the present invention is not limited to this. Equivalent modifications or replacements may be made to the embodiments of the present invention by persons skilled in the art without departing from the spirit and essence of the present invention, and these modifications or replacements all fall within the protection scope of the present invention.

What is claimed is:

1. A computer subsystem, comprising L composite nodes, wherein each composite node comprises M basic nodes, each basic node comprises N central processing units (CPUs) and one node controller (NC), wherein L is an integer and greater than or equal to 4, M is an integer and greater than or equal to 2, and N is an integer and greater than or equal to 3, wherein each NC in each basic node is configured to route information to one or more NCs in the computer subsystem, and wherein each CPU in each basic node is connected directly to all other N-1 CPUs in said each basic node, each CPU in each basic node is connected to the NC in said each basic node, each NC of the M basic nodes in each composite node is connected directly to all other M-1 NCs of the M basic nodes in said each composite node, and a NC in a first composite node is interconnected directly with a NC in a second composite node.

2. The computer subsystem according to claim 1, wherein each basic node comprises eight CPUs.

3. The computer subsystem according to claim 1, wherein the computer subsystem comprises eight composite nodes.

4. The computer subsystem according to claim 1, wherein each composite node comprises a first basic node and a second basic node, and wherein a NC in a first composite node is connected to a NC in a second composite node such that an NC of the first basic node in the first composite node is interconnected directly to an NC of the first basic node in the second composite node, and an NC of the second basic node in the first composite node is interconnected directly to an NC of the second basic node in the second composite node.

5. A computer system, comprising two structurally identical computer subsystems, the first computer subsystem and the second computer subsystem comprising L composite nodes, wherein each composite node comprises M basic nodes, each basic node comprises N central processing units (CPUs) and one node controller (NC), wherein L is an integer and greater than or equal to 4, M is an integer and greater than or equal to 2, and N is an integer and greater than or equal to 3, and wherein each CPU in each basic node is connected directly to all other N-1 CPUs in said each basic node, each CPU in each basic node is connected to the NC in said each basic node, each NC of the M basic nodes in each composite node is connected directly to all other M-1 NCs of the M basic nodes in said each composite node; a NC in a first composite node is connected to a NC in a second composite node, and a NC in each composite node of a first computer subsystem and an NC of a corresponding basic node in a corresponding composite node of a second computer subsystem are interconnected directly, wherein each NC in each basic node is configured to route information to an NC of the M basic nodes.

6. The computer system according to claim 5, wherein each computer subsystem comprises eight composite nodes, each composite node comprises M basic nodes, and each basic node comprises eight CPUs and one NC.

7. The computer system according to claim 5, wherein each composite node comprises a first basic node and a second basic node, and wherein a NC in each composite node of the first computer subsystem and an NC of a corresponding basic node in a corresponding composite node of the second computer subsystem are interconnected such that an NC of a first basic node in a first composite node of the first computer subsystem is interconnected directly to an NC of a first basic node in a first composite node of the second computer subsystem, and an NC of a second basic node in the first composite node of the first computer subsystem is interconnected directly to an NC of a second basic node in the first composite node of the second computer subsystem.

8. The computer system according to claim 5, wherein each composite node comprises a first basic node and a second basic node, and wherein in each computer subsystem a NC in a first composite node is connected to a NC in a second composite node such that an NC of the first basic node in the first composite node is interconnected directly to an NC of the first basic node in the second composite node, and an NC of the second basic node in the first composite node is interconnected directly to an NC of the second basic node in the second composite node.

9. A computer subsystem, comprising a composite node, wherein the composite node comprises M basic nodes, each basic node comprises N central processing units (CPUs) and one node controller (NC), wherein M is an integer and greater than or equal to 2, and N is an integer and greater than or equal to 3, and wherein each CPU in each basic node is connected directly to all other N-1 CPUs in said each basic node, each CPU in each basic node is connected to the NC in said each basic node, each NC of the M basic nodes in the composite is connected directly to all other M-1 NCs of the M basic nodes in said each composite node, wherein each NC in each basic node is configured to route information to another NC of the M basic nodes, wherein the composite node comprises a first basic node and a second basic node, and wherein any two NCs of the M basic nodes in the composite node are interconnected such that a first NC of the first basic node in the composite node is interconnected directly to a first NC of the second basic node in the composite node, and a second NC of the first basic node in the composite node is interconnected directly to a second NC of the second basic node in the composite node.

* * * * *